April 7, 1959     A. P. ROBISHAW     2,880,881
UNITIZED PIPE RACK

Filed Jan. 4, 1954     6 Sheets-Sheet 1

ALCES PAUL ROBISHAW
INVENTOR.

BY
*Browning Simmons & Hyer*

ATTORNEYS

April 7, 1959 A. P. ROBISHAW 2,880,881
UNITIZED PIPE RACK

Filed Jan. 4, 1954 6 Sheets-Sheet 3

ALCES PAUL ROBISHAW
*INVENTOR.*

BY

ATTORNEYS

April 7, 1959     A. P. ROBISHAW     2,880,881
UNITIZED PIPE RACK Filed Jan. 4, 1954     6 Sheets-Sheet 5

ALCES PAUL ROBISHAW
*INVENTOR.*

BY
ATTORNEYS

April 7, 1959 A. P. ROBISHAW 2,880,881
UNITIZED PIPE RACK
Filed Jan. 4, 1954 6 Sheets-Sheet 6

ALCES PAUL ROBISHAW
INVENTOR.

BY
*Browning Simms & Hyer*

ATTORNEYS

United States Patent Office 2,880,881
Patented Apr. 7, 1959

2,880,881

UNITIZED PIPE RACK

Alces Paul Robishaw, Houston, Tex., assignor to
C. N. Housh, Houston, Tex.

Application January 4, 1954, Serial No. 401,923

14 Claims. (Cl. 211—60)

This invention relates to pipe handling apparatus and more particularly to a lay-down trough and pipe rack adapted for use in the handling of pipe during the drilling of a well which may be collapsed for transporting from one site to another without disassembling.

During the drilling of oil or other deep wells it is frequently necessary to remove the drill string from the well. One manner of handling the joints of pipe as they are broken out of the string is to place them on a horizontally disposed pipe rack which is positioned adjacent the derrick.

Heretofore it has been the general practice to build such pipe racks in the field by welding, bolting or otherwise assembling sections of pipe or other structural members together to form a rack. After the well has been completed the rack must be disassembled before it can be removed from the well site.

This invention contemplates the provision of an apparatus which may be expanded to form a pipe rack and collapsed into a compact unit for transporting between locations.

There is usually no special apparatus provided for transferring pipe to and from the derrick other than a skidway of planking or the like. When removing pipe from the well, the pipe is taken out the open side of the derrick and skidded out onto the skidway from whence it is transferred to the pipe rack. Usually the skidway and bed of the rack are at the same level and in forming all but the lower tier of pipe on the rack, the sections of pipe must be lifted manually from the skidway and placed on the stack which may be several tiers high. In the reverse operation pipe is rolled from the rack onto the skidway, a rig line is secured to one end of the pipe, and the pipe is pulled up into the derrick superstructure.

This invention contemplates the provision of a simple, economical pipe ramp in which pipe may be skidded to and from the derrick platform which will also transfer to or receive pipe from a pipe rack without the necessity of manually lifting the pipe.

The floor of the ordinary drilling derrick is located some distance above the surface of the earth to provide room for blow-out preventers and the like. Thus, it is desirable to provide a pipe slide or ramp between the derrick floor and the pipe trough to assist in the transfer of pipe therebetween. To facilitate placement of the pipe trough adjacent a derrick with which it is to be used it is also desirable to have a slide which will permit some leeway in the positioning of the trough relative to the derrick. When used with a vertically adjustable pipe trough, as contemplated by this invention, it is also desirable that the end of the slide which is adjacent the pipe handling trough be vertically adjustable so as to be directly above the trough when the latter is in either its upper or lower positions.

It would further be desirable to have these various pipe handling elements carried by a central framework to facilitate placement and adjustment, and it is a general object of this invention to provide a unitized, portable, pipe handling trough, pipe slide, and pipe rack which may be collapsed without disassembly and transported as a unit by truck and trailer.

Another object is to provide a portable pipe rack which is collapsed during transit to and from location and which may be quickly and easily expanded on location.

Another object is to provide a portable pipe rack in which the sills of the rack may be collapsed in accordion folds for transport and extended on location to form the pipe rack.

Another object is to provide a portable pipe rack in which the sills of the rack may be collapsed in accordion folds for transport and extended on location to form the pipe rack, wherein the latch parts which maintains the sills in extended position also cooperate to maintain the sills in collapsed position.

Another object is to provide a vertically adjustable pipe handling trough for transferring pipe to and from an adjacent rack in which pipe may be transferred from the trough to a stack of pipe on the rack and vice versa without manually lifting the pipe.

Another object is to provide a tiltable pipe handling trough which is simple and rugged in construction.

Another object is to provide a pipe slide for transferring pipe between a derrick floor and a pipe trough which may be utilized with a vertically adjustable pipe trough.

Another object is to provide a pipe slide of the character described which may be utilized with a vertically adjustable, tiltable pipe trough.

Another object is to provide a portable pipe trough and pipe slide carried by a single frame in which the pipe slide is mounted to permit leeway in positioning the pipe trough relative to the derrick with which it is to be used.

Other objects, features and advantages of the invention will appear as the description proceeds.

In the drawings wherein like reference numerals indicate like parts and wherein there is shown by way of illustration one embodiment of this invention.

The apparatus in general includes a pipe rack and lay-down pipe trough built around an elongate frame section generally indicated at 10, and whose length is substantially that of the bed of a conventional float-type trailer. The pipe rack comprises sills 11 which may be collapsed and folded against the elongate frame during transporting of the apparatus and quickly expanded on location to provide a storage rack. The lay-down pipe trough 13 is carried on the top of the frame section and is positionable in a lowered position for transferring pipe from the pipe rack to the trough and in a raised position for transferring pipe from the trough to the rack. The trough is provided with a tiltable feature whereby it may be rotated or tilted about its longitudinal axis to discharge pipe from the trough when in its raised position. To facilitate transferring pipe between the derrick floor and the trough there is provided a pipe ramp 12 at one end of the frame section which when unfolded extends from the pipe trough to the derrick floor. A catwalk of planks 14 is provided on frame 10 along each side of the trough 13 and an extension 15 of this catwalk is hinged to the frame 10 at its end opposite the pipe ramp. Suitable stairs and landing are also provided attached to the frame 10 as will hereinafter appear in more detail.

Referring now in more detail to the drawings, the pipe rack proper, lay-down trough, pipe ramp and catwalk extension are built around and carried by the elongate frame 10. The frame illustrated is substantially rectangular and includes a pair of spaced I-beams 16 extending the length of the frame to form a base therefor. A pipe 17 is positioned above and extends parallel to each I-beam 16 and is secured thereto by vertical and diagonal bracing 18 (Fig. 8) to form a rigid truss member on each side of the frame 10. These truss members are held in spaced relation by upper and lower crossbeams 19 and 20, respectively. The lower crossbeams 20 support the lay-down trough when in its raised position upon toggle links which are pivoted to shackle-like hinge members 20a carried by crossbeams 20. The upper crossbeams 19 support the lay-down trough in its lowered position as well as a catwalk of planking 14 arranged on each side of the lay-down trough.

Spaced along each side of the elongate frame are a plurality of supports for the pipe rack. These supports may be in the form of vertically disposed pipes or tubular members 21 welded or otherwise secured to the ends of upper and lower crossbeams 19 and 20. The exterior of pipes 21 provides pivots about which the sills of the pipe rack may be swung. Ball bearing cups 22 located in the upper portion of pipes 21 support ball bearing 23 which in turn support sills 11 as will appear below.

Adjustable supports for the elongate frame are provided by supporting columns 24 which are telescoped in pipes 21 and secured in the desired telescoping relationship by pins 23 which pass through one of a group of vertically spaced holes 21a in pipe 21 and matching holes through columns 24. The lower end of columns 24 are received in bearing plates 25 which distribute the load on each column over a large area of the ground.

Figure 1:
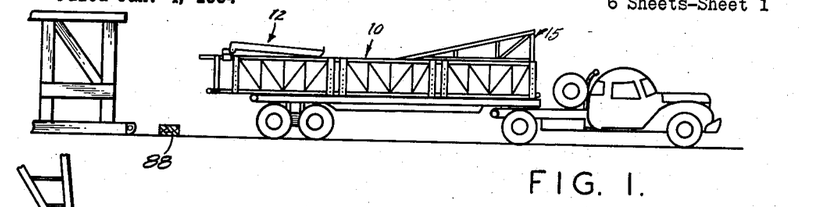
Fig. 1 is a diagrammatic view of the pipe handling apparatus of this invention loaded on a float-type trailer.
Figure 2:
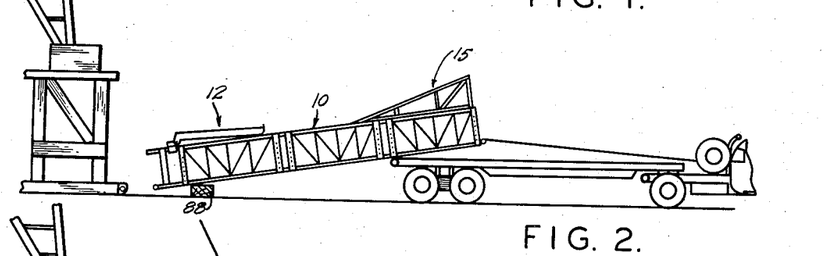
Fig. 2 is a diagrammatic view of the pipe handling apparatus of Fig. 1 partially unloaded from the truck.
Figures 3, 4:
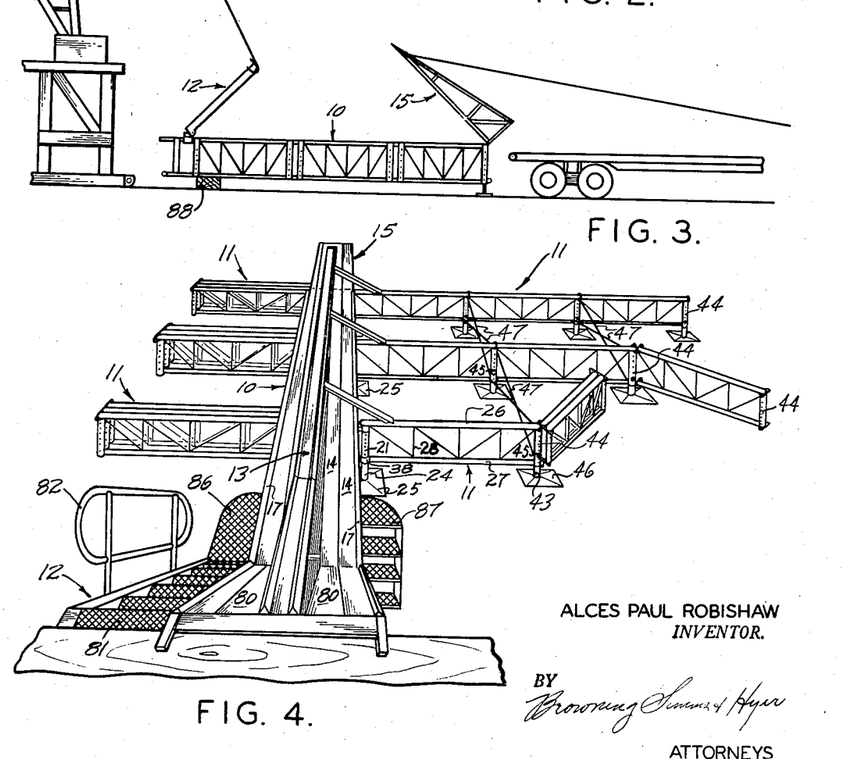
Fig. 3 is a diagrammatic view of the pipe handling apparatus of Fig. 1 in position adjacent a derrick, with the pipe slide being extended by a rig line from the derrick and the catwalk being extended by a line from the truck's winch.
Fig. 4 is a driller's perspective from the derrick platform of the pipe handling apparatus of Fig. 1 with the sills of the pipe rack in various stages of extension and with the pipe trough in elevated position.
Figure 5:
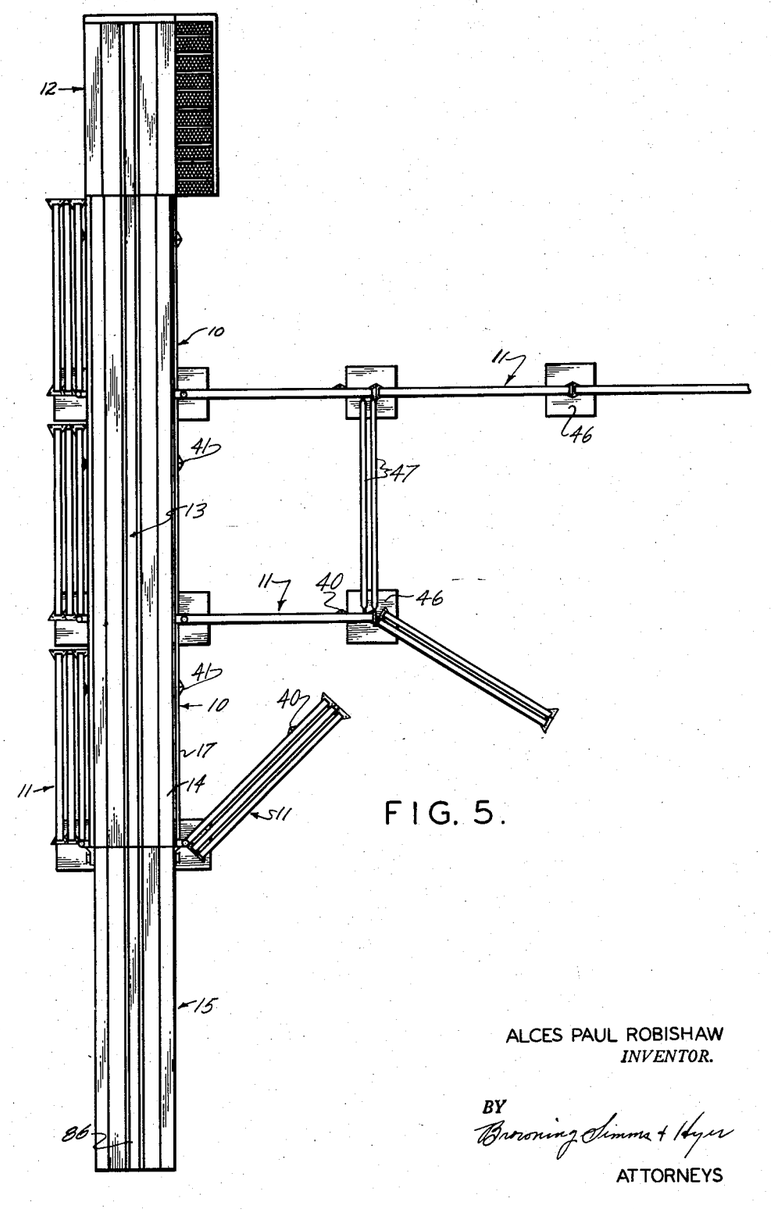
Fig. 5 is a top plan view of the pipe handling apparatus of Fig. 1 with the sills of the pipe rack in various stages of extension.

The elongate frame is provided at one end with suitable hinge ears 17a to which the catwalk extension 15 is hinged to allow it to be folded back over the top of the elongate frame as illustrated in Fig. 1.

The pipe rack includes a plurality of sills 11 which may be collapsed against the frame 10 during transporting, and extended laterally therefrom to form a support for pipe. Preferably, two groups of sills are used with one group extending from each side of the elongate frame, but it will be understood that a single group might be used if desired. The two groups are preferred as this arrangement positions the lay-down trough 13 in the center of the two pipe supporting sections and hence closer to all parts of the rack.

The sills 11 include upper and lower structural beams 26 and 27, respectively, spaced from each other by vertical and diagonal bracing 28 in a manner to form a rigid truss. As it is desired to fold the sills alongside the frame 10 in the space between adjacent pivot members 21, which is much shorter than the length of the sill, each sill is broken into sections 11a and the sections are hinged together by pairs of vertically spaced hinges to allow the sill to be collapsed in accordion folds. Preferably, there is also provided a latch which will maintain the sill sections in extended or folded position.

Figure 12:
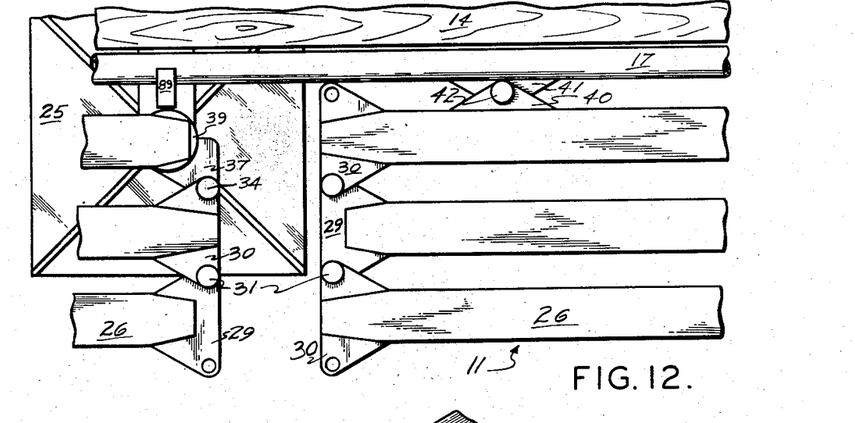
Fig. 12 is an enlarged, plan view of a fragment of the apparatus illustrating the manner in which the sill sections are retained in folds against the central frame.
Figures 13, 14:
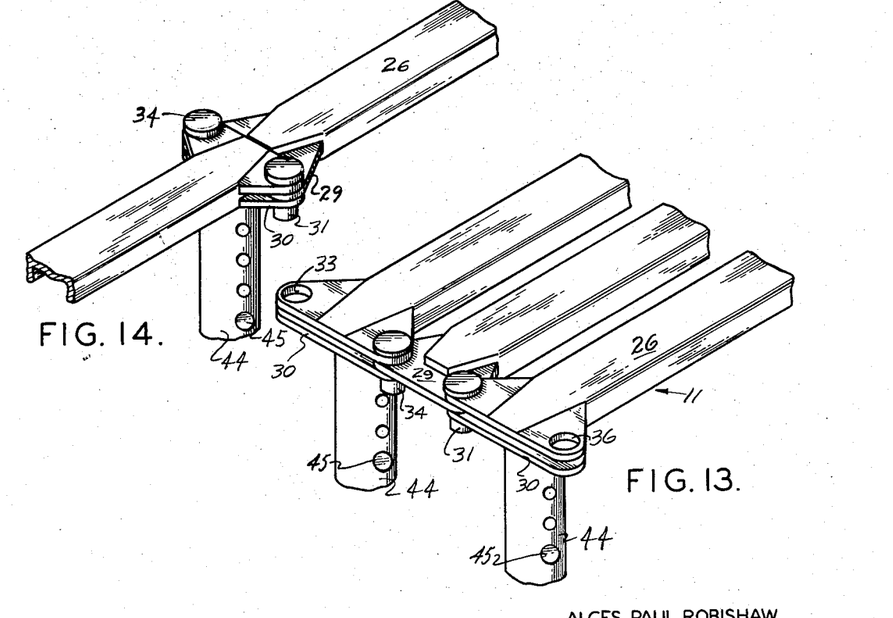
Fig. 13 is an enlarged, perspective view further illustrating the manner in which the sections of a sill may be retained in folds.
Fig. 14 is an enlarged, perspective view of the joint between adjacent sill sections.

The preferred form of hinge and latch includes tongue and groove parts 29 and 30, respectively, carried on opposite ends of each sill section 11a. The sections are arranged with the tongue of one section extending into the groove of an adjacent sill section when the sill is extended. A pin 31 is releasably received in registering holes 32 and 33 in the tongue and groove, respectively, and a pin 34 is releasably received in registering holes 35 and 36 in the tongue and groove, respectively. The two groups of registering holes are spaced horizontally from each other and pins 31 and 34 are interchangeably the hinge pin and the latch pin depending upon the direction in which the sections are swung in folding the sill. In order that the same latch parts may function to latch the sill sections in collapsed position, the distance between the holes in the tongue part 29 and the holes in the groove part 30 of each sill is identical. When the sill sections are arranged in folds the tongue and groove latch parts of adjacent sill sections will overlap and the latch pin may be inserted in the registering holes in the latch parts to retain the sections in folds, as illustrated in Figs. 12 and 13. The end of the sill section which is to be pivoted to the frame 10 does not have a tongue 29 as it would interfere with pivoting of the sill. Instead there is provided an ear 37 to which the adjacent sill section may be latched by pin 34.

Each of the sills 11 is mounted at one of its ends on the elongate frame 10 in a manner to permit the sill to be collapsed and arranged along one side of the frame. Preferably, this mounting is one which will permit swinging movement so that the sills may be folded against the side of the frame in accordion folds for transport and extended laterally therefrom to provide a pipe rack. It will be recalled that vertically disposed pivot pipes 21 are spaced along each side of frame 10. The end of a sill which is to be fastened to the frame is provided with a lower bearing collar 38 and an upper bearing cap 39. Collar 38 is received about the lower section of pivot pipe 21 and cap 39 fits over the upper end of pipe 21 and rests upon ball 23 which supports the sill for swinging movement about pivot pipe 21.

Each innermost sill section carries an ear 40 which overlaps an ear 41 on frame 10 when the sill is in transporting position and a pin is releasably received in registering holes in the ears to hold the folded sill against the frame.

As the sills 11 extend some distance from the frame 10 and the pipe to be stored thereon is very heavy, additional support should be provided at spaced points along each sill. Preferably, these points coincide with the placement of the hinges so that each sill section will be supported at each of its ends. Such support may be provided by support columns 43 telescoped in receivers 44 and held in the desired telescoping relationship by pins 45 in registering holes in the columns and receivers. Columns 43 rest upon bearing plates 46. In addition to supporting the sills the support columns also serve to position the sills in their laterally extended position.

The sills are tied together at spaced points by diagonal bracing 47 which may be secured to the sill by any convenient means such as a hook and eye assembly as will be well understood by those skilled in the art. Diagonal bracing 47 will also serve to maintain the sills in extended position.

In accordance with one aspect of this invention there is provided a lay-down trough which may be positioned at a level as low as the bed of the pipe rack with which it is to be used, and which may be raised to a level above the bed of such pipe rack. When the trough is in its lowered position pipe may be rolled from the rack onto the trough without manually lifting the pipe. When the trough is in its raised position pipe may be rolled from the trough to the rack without manually lifting the pipe by tilting the trough.

Lay-down trough 13 extends lengthwise of the frame and has a base 48 supporting the pipe receiving platform 49. Inverted angle irons 50 and 51 are welded or otherwise secured to the upper face of platform 49 to provide side walls therefor. It will be noted that the adjacent legs of angle irons 50 and 51 diverge from platform 49 and will not impede the discharge of pipe from the trough when the platform is tilted.

Platform 49 is positioned on base 48 by a pivot arrangement to allow the platform to be tilted to discharge pipe. Base 48 is provided with laterally extending ears 52 spaced along both of its sides, and platform 49 has ears 53 depending therefrom which are spaced apart to receive the base therebetween. Ears 53 are also spaced along the platform in side-by-side association with the ears on the base. Registering holes in ears 52 and 53 receive pivot pins 54. Usually pins 54 will be positioned in the ears along one side of the trough so that the platform may be tilted about these pins to discharge pipe. Pipe may be discharged to either side of the trough depending upon the placement of pivot pins 54.

Figure 8:
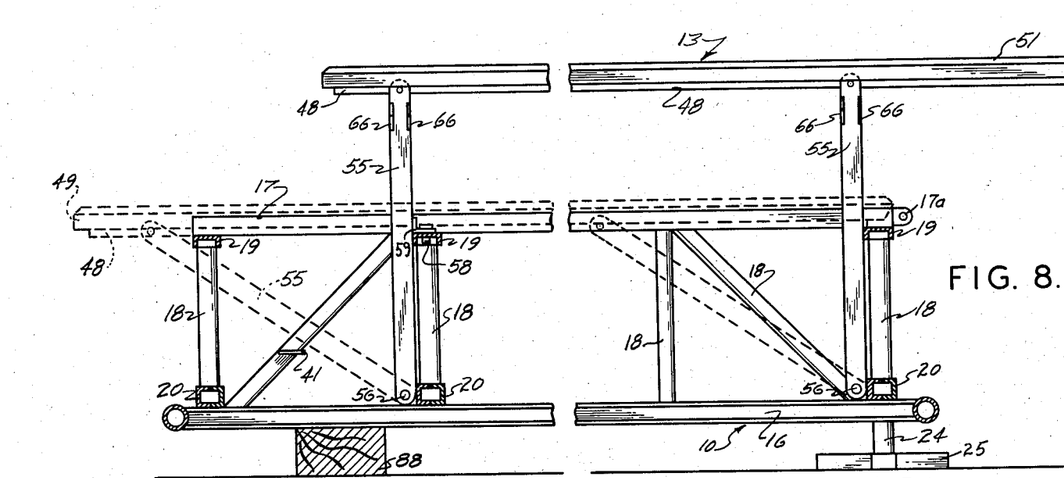
Fig. 8 is a view taken along the line 8—8 of Fig. 7, looking in the direction of the arrow, the parts broken away for purposes of illustration, showing the lay-down trough in raised position in solid lines and in lowered position in dotted lines.
Figure 10:
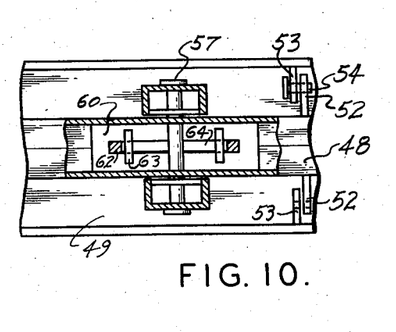
Fig. 10 is a worm's-eye view along the line 10—10 of Fig. 7.
Figure 11:
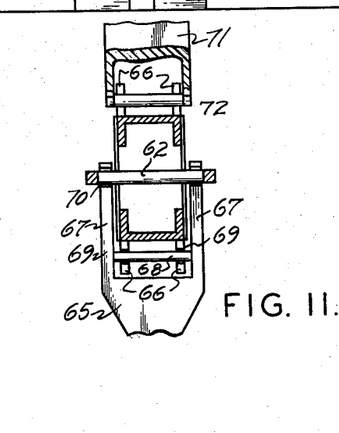
Fig. 11 is a bird's-eye view along the line 10—10 of Fig. 7.

Trough 13 may be positioned level with the catwalk 14 or it may be raised to a position some distance above the catwalk. This positioning means includes a plurality of links 55 which are pivoted to the lower crossbeam 20 of the frame by pins 56 and to the trough base 48 by pins 57. Links 55 are of equal length so that the lay-down trough will be horizontal at all times. In the structure illustrated links 55 are vertical when the trough is in raised position and a pin 58 may be inserted in registering holes in a frame crossbeam 19 and an angle piece 59 carried by an adjacent link to hold the trough in raised position (Fig. 8). When the trough is in lowered position base 48 rests upon upper crossbeams 19 of the frame 10 and is supported thereby.

As pointed out above the pipe receiving platform 49 is tiltable to facilitate the discharge of pipe and in accordance with this invention there is provided a simple, rugged means for tilting the platform to either side, with the direction of tilt being determined by the positioning of pivot pins 54. The tilting mechanism can be a link depending from the nether side of platform 49 and extending through the base 48 whereby raising of the link will tilt the platform. In the tilting mechanism illustrated a section of the top of base 48 is cut out as at 60 and a slotway or guide 61 is cut in the bottom of the base directly below cut-out 60. A link 62 extends through guide 61 and is pivoted to ears 63 on the nether side of platform 48 by a pivot pin 64. Link 62 extends some distance below base 48 in order that it may be engaged by a lifting bar 65.

The tilting mechanism is located directly above one of the trough supporting links 55 and a pair of spaced fulcrum members 66 are carried on both sides of this link 55.

The tilting bar 65 is forked on one end and has a crossbar 68 extending between the tines 67 of the fork. Crossbar 68 is received in slots 69 in fulcrum members 66, and the tines of the fork pass to either side of link 55 to engage the tilting link 62. Tines 67 are provided with slots 70 which receive tilting link 67 to prevent it from sliding along bar 65 during raising of the tilting link. Rotation of bar 65 around fulcrum members 66 will raise link 62, which in turn will tilt platform 48 to discharge pipe therefrom. By providing fulcrum members 66 on both sides of link 55, bar 65 may be operated from either side of the trough depending upon the direction in which the trough is to be tilted.

Figures 7, 9:
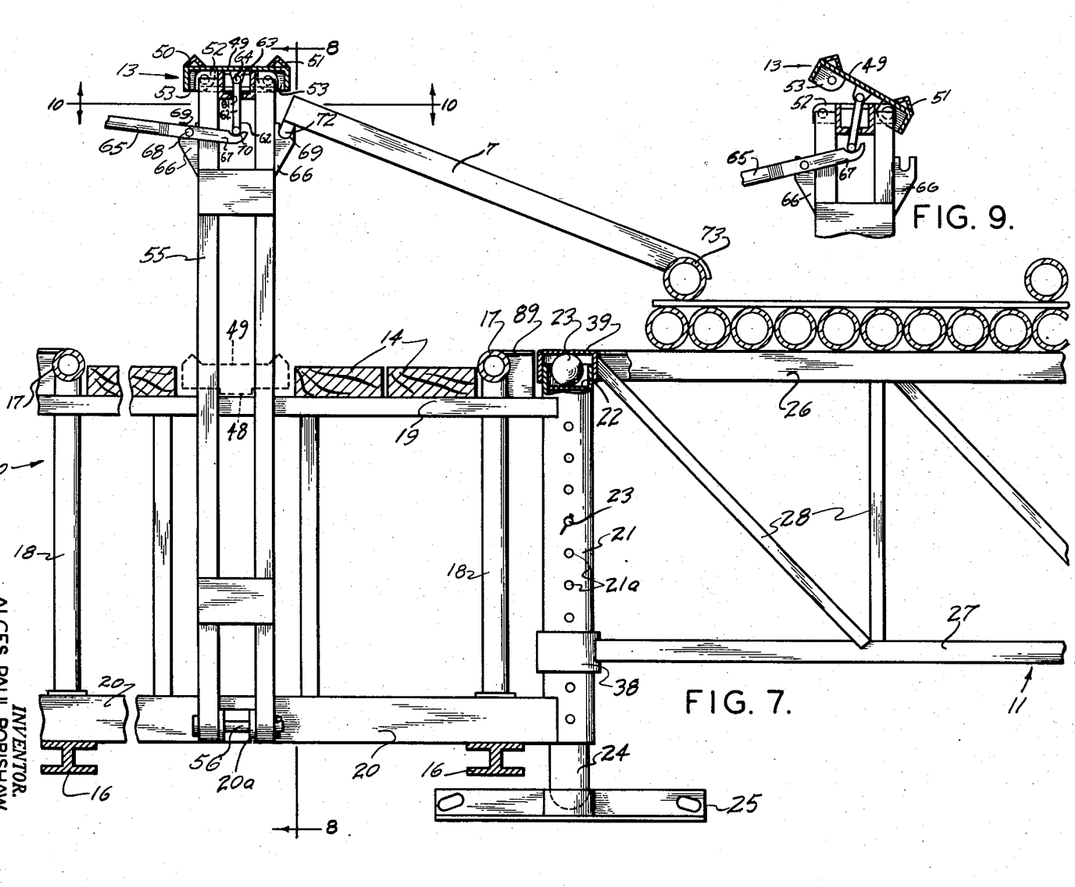
Fig. 7 is a fragmentary sectional view through the elongate frame with the lay-down trough shown in raised position in solid lines and in lowered position in dotted lines, and illustrating certain details of the apparatus.
Fig. 9 is a fragmentary section through the pipe trough with the pipe receiving platform shown in tilted position.

When transferring pipe from trough 13 in its raised position to the sills 11, it is preferred to extend side ramps 71 from the trough to the top tier of pipe on the rack. Ramps 71 carry at one of their ends a crossbar 72, which is received in one of fulcrum members 66. The other end of ramps 71 may be formed with a substantially half-circle cut-out 73 to fit about a pipe on the rack as illustrated in Fig. 7. Preferably, members 66 are provided on each link 55 so that there may be employed a plurality of side ramps 71.

Figures 6, 15:
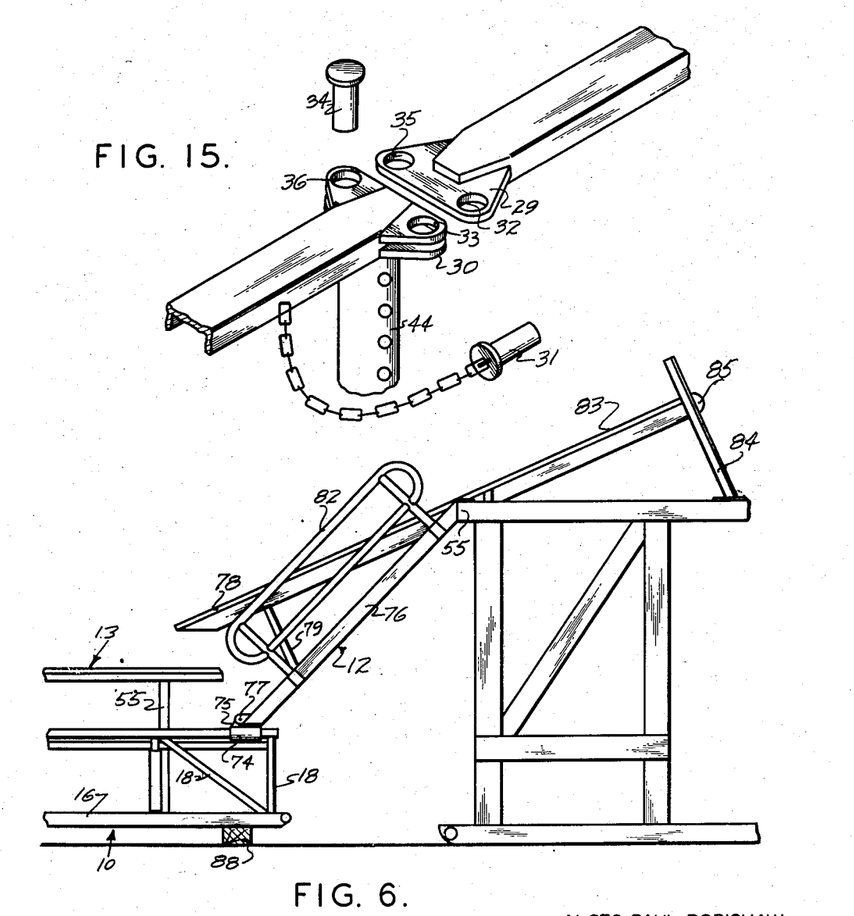
Fig. 6 is a side view of a fragment of the pipe handling apparatus of this invention illustrating the ramp and its relationship with the lay-down trough and the derrick platform.
Fig. 15 is an enlarged, exploded perspective of the joint of Fig. 14.

Referring now to Fig. 6, there is illustrated a ramp and a removable extension therefor which extends from a point adjacent the turntable of the derrick to the lay-down trough 13. Preferably, the ramp proper terminates at the edge of the derrick platform so as not to interfere with normal drilling operations. It is also preferred that the ramp be permanently secured to frame 10 so that it may simply be folded over the frame for transport and folded out to engage the derrick platform. Ramp 12 is carried by the central frame 10 on a sliding pivot to permit slight leeway in positioning the frame adjacent the derrick. The sliding pivot is provided by two collars 74; one about each upper frame member 17 and slidable therealong between the endmost vertical and diagonal braces 18. Collars 74 have upstanding flange parts 75 to which the ramp frame 76 is pivoted by pivot pins 77. Collars 74 will slide along frame members 17 and ramp frame 76 will rotate about pivots 77 to permit the desired leeway in positioning frame 10 relative to the derrick. Once in position ramp frame 76 may be welded, spiked or otherwise secured to the derrick platform.

The trough 78 of ramp 12 is hinged to the trough frame at its free end and may be raised or lowered with laydown trough 13. Preferably, there is provided a support 79 for trough 78 to maintain the ramp trough 78 above the laydown trough 13 when the latter is in its raised position to prevent the ramp trough from interfering with the tilting mechanism. Support 79 may be releasably secured between ramp frame 76 and trough 78 in any desired manner.

Ramp trough 78 may be continued on the derrick platform by an extension 83 which has one end releasably secured to the platform adjacent trough 78 and the other end raised above the platform on support 84. A roller 85 at the raised end of the extension reduces friction between a pipe and the troughs when the pipe is released by the traveling block. This extension will usually be removed during normal drilling operations so as not to obstruct the drilling platform.

Ramp 12 carries a catwalk 80 and a stairway 81. A removable handrail 82 may be secured to the ramp, if desired. A landing 86 is carried by the frame at the foot of stairway 81 and a second stairway 87 leads from the catwalk to the ground. Landing 86 and stairway 87 are carried on the central frame by vertical pivots and swing under the catwalk during transport.

As the lay-down trough in its raised position projects over the end of frame 10, there is provided a catwalk extension 15 hinged to the frame at 25. If desired, extension 15 may have a trough extension 86 which is in line with and forms a continuation of trough 13 when the latter is in its lower position.

The first step in the erection of the apparatus is to set a wooden sill 88 perpendicular to the longitudinal axis of the catwalk and in proper position on the open side of the derrick. The loaded truck is then backed into position as shown in Fig. 1 and the apparatus is pulled back on the trailer bed and the derrick end of the frame comes to rest on the wooden sill. As the trailer moves forward the apparatus is unloaded by its own weight. As the outer end of the frame clears the trailer, it is lowered slowly by the winch line from the tractor. Bearing plates 25 are set in position and support columns 24 are set at the proper elevation by pins 23.

The catwalk extension is folded back by means of the winch line from the truck and a rig line from the derrick is used to extend the ramp 12 to the derrick platform.

Pins 42 which hold the sills 11 to the frame 10 are removed and the sills folded out until ears 37 strike stops 89. The first sections are supported by their bearing plates and adjustable columns. The latch pins are then removed and the remaining sections of the sills are extended and latched in position. As the sections are extended diagonal bracing 47 is attached between the sills. After the bracing is in position the remaining support columns may be dropped from their nest in receivers 44 and secured in the proper telescoping relationship.

Handrail 82 is secured in place, and landing 86 and stairway 87 pivoted out into position.

When it is desired to raise lay-down trough 13, a rig line may be run out from the derrick, passed over a pulley carried by frame 10, and then secured to trough 13 at a point inboard toward the derrick from the pulley. The rig line may then be taken in to raise the trough and the same may be secured in raised position by a pin 58.

From the above it will be seen that there has been provided a sturdy structural unit that can be erected on uneven ground in a few minutes. All the features and equipment necessary for supporting and handling drill pipe, casing, and tubing are incorporated in the unit.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A portable pipe rack comprising, an elongate frame disposable in a substantially horizontal position, a plurality of sills on one side of the frame, and means pivotally connecting each of said sills to the frame for swinging in a substantially horizontal path and about a substantially vertical axis between a position collapsed against said one side of the frame for transporting and another position extending laterally therefrom to form a storage support for pipe, said sills being of such construction as to support a large number of pipes thereon in the extended position thereof.

2. A pipe rack of the character defined in claim 1, including a vertically extensible supporting column carried by each sill to position and support it in its laterally extended position.

3. A pipe rack of the character defined in claim 1, including means positioning said sills in their laterally extending positions.

4. A pipe rack of the character defined in claim 1, including means to maintain the sills in collapsed position.

5. A portable pipe rack comprising, an elongate frame, a plurality of pipe-supporting sills, and means pivotally connecting the sills to the frame for swinging about axes substantially normal to the major dimension of said frame, each sill comprising a plurality of sill sections pivotally connected together for swinging about axes substantially parallel to the axes of the pivotal connections of the sills to the frame to allow each sill to be positioned in accordion folds against one side of the frame for transporting and to be extended laterally of the elongate frame to form a storage support for pipe.

6. A portable pipe rack of the character defined in claim 5, including means to maintain the sills in collapsed position.

7. A portable pipe rack comprising, an elongate frame, a plurality of pipe-supporting sills, and means pivotally connecting the sills to the frame for swinging about axes substantially normal to the major dimension of said frame, each sill comprising a plurality of sill sections pivotally connected together for swinging about axes substantially parallel to the axes of the pivotal connections of the sills to the frame to allow each sill to be positioned in accordion folds against one side of the frame for transporting and to be extended laterally of the elongate frame to form a storage support for pipe, and means selectively retaining the sills in their laterally extended positions.

8. A portable pipe rack comprising, an elongate frame, a plurality of pipe-supporting sills, and means pivotally connecting the sills to the frame for swinging about axes substantially normal to the major dimension of said frame, each sill comprising a plurality of sill sections pivotally connected together for swinging about axes substantially parallel to the axes of the pivotal connections of the sills to the frame, and the length of each of said sections being less than the distance between the pivotal connections of adjacent sills to the frame allowing the sills when not in use to be placed against one side of the frame in accordion folds which extend parallel to the length of the frame.

9. A portable pipe rack comprising, an elongate frame, a plurality of pipe-supporting sills, means pivotally connecting said sills to the frame for swinging about axes substantially normal to the major dimension of the frame, each sill comprising a plurality of sill sections pivotally connected together for swinging about axes substantially parallel to the axes of the pivotal connections of the sills to the frame to allow the sill to be positioned in accordion folds against one side of the frame for transporting or to be extended laterally of the elongate frame to form a storage support for pipe, and releasable latch means between adjacent sections of a sill releasably maintaining the sections of the sill in their extended position.

10. The pipe rack of claim 9 wherein each pivotal connection and latch means between sill sections comprises two horizontally spaced apart pins, one of which is removable to permit the other to act as a pivot between the sections.

11. A portable pipe rack comprising, an elongate frame, a plurality of pipe-supporting sills, means pivotally connecting the sills to the frame for swinging about axes substantially normal to the major dimension of said frame between a position collapsed against one side of the frame for transporting and another position extending laterally therefrom to form a storage support for pipe, and vertically extensible supporting columns carried by each sill positioning and supporting the sills in their laterally extended positions, said frame supporting the sills during transport and placement of the rack and said supporting columns providing the principal support for the sills when a load is placed on the rack.

12. The pipe rack of claim 11 wherein the sills are additionally held in their extended positions by braces extending between the sills at points remote from the elongate frame.

13. A portable pipe rack comprising, an elongate frame, a pipe-supporting sill, means pivotally connecting said sill to the frame for swinging about an axis substantially normal to the major dimension of said frame, said sill including a plurality of sill sections pivotally connected together for swinging about axes substantially parallel to the axis of the pivotal connection of the sill to the frame to allow the sill to be positioned in accordion folds against one side of the frame for transporting or to be extended laterally of the elongate frame to form a storage support for pipe, and releasable latch means between adjacent sections of the sill releasably maintaining the sill in either its extended position or in folds.

14. The pipe rack of claim 13 wherein the releasable latch means includes parts carried by the sill sections which overlap when the sill is fully extended and pins selectively positionable in registering holes in said parts to maintain the sill in extended position, and wherein said parts of one section also overlap parts carried by an adjacent section when the sections are arranged in folds, and the latch pins are received in registering holes in said last-mentioned overlapping parts to maintain the sections in folded position.

References Cited in the file of this patent

UNITED STATES PATENTS

| | | |
|---|---|---|
| 658,880 | Tandy | Oct. 2, 1900 |
| 1,885,223 | Bouslog | Nov. 1, 1932 |
| 1,887,901 | Dodson | Nov. 15, 1932 |
| 2,194,125 | Rinehart | Mar. 19, 1940 |
| 2,201,813 | Doud | May 21, 1940 |
| 2,464,109 | Woolslayer et al. | Mar. 8, 1949 |
| 2,535,979 | Witte | Dec. 26, 1950 |
| 2,589,181 | Yount | Mar. 11, 1952 |
| 2,615,585 | Menhall | Oct. 28, 1952 |
| 2,665,815 | Blight | Jan. 12, 1954 |